July 29, 1969

H. A. LOZEAU 3,458,697

SAFETY LIGHTING EQUIPMENT

Filed March 9, 1967

Inventor:
Homer A. Lozeau by
Attorney

July 29, 1969 H. A. LOZEAU 3,458,697
SAFETY LIGHTING EQUIPMENT
Filed March 9, 1967 6 Sheets-Sheet 2
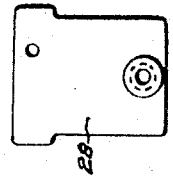
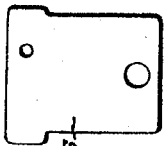
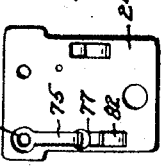
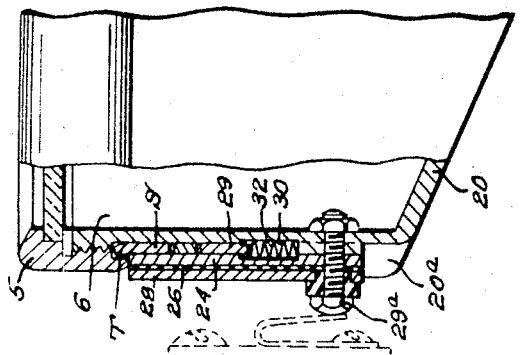
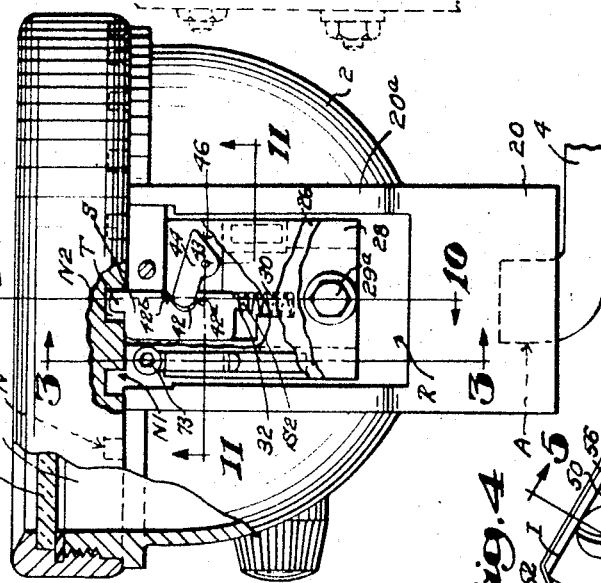
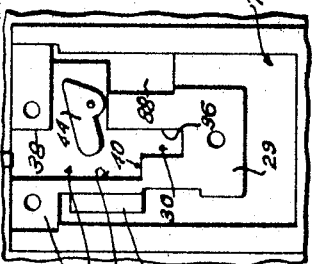
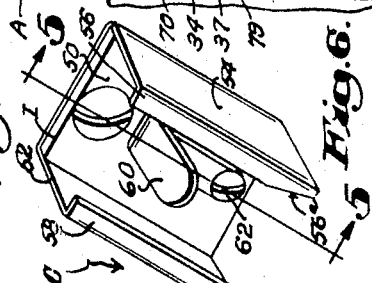
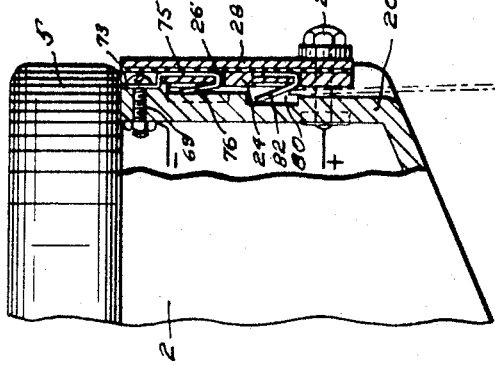
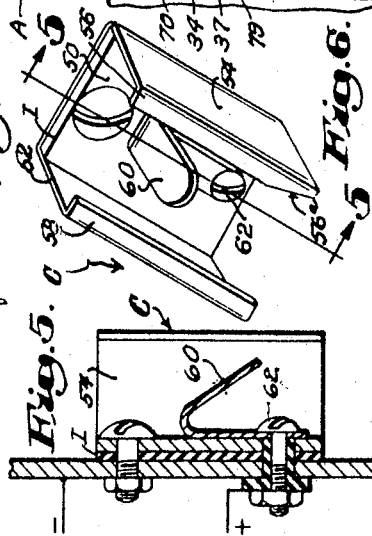
Inventor:
Homer A. Lozeau
Attorney

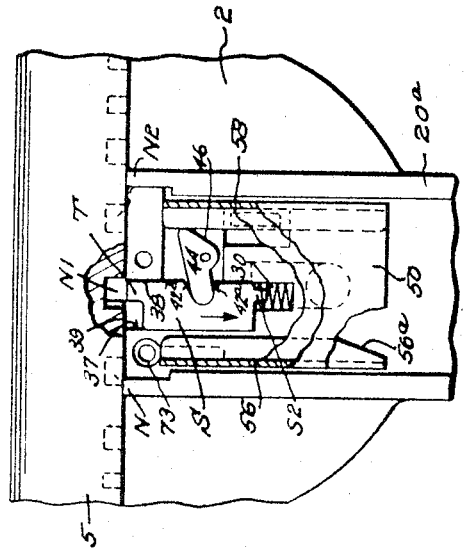

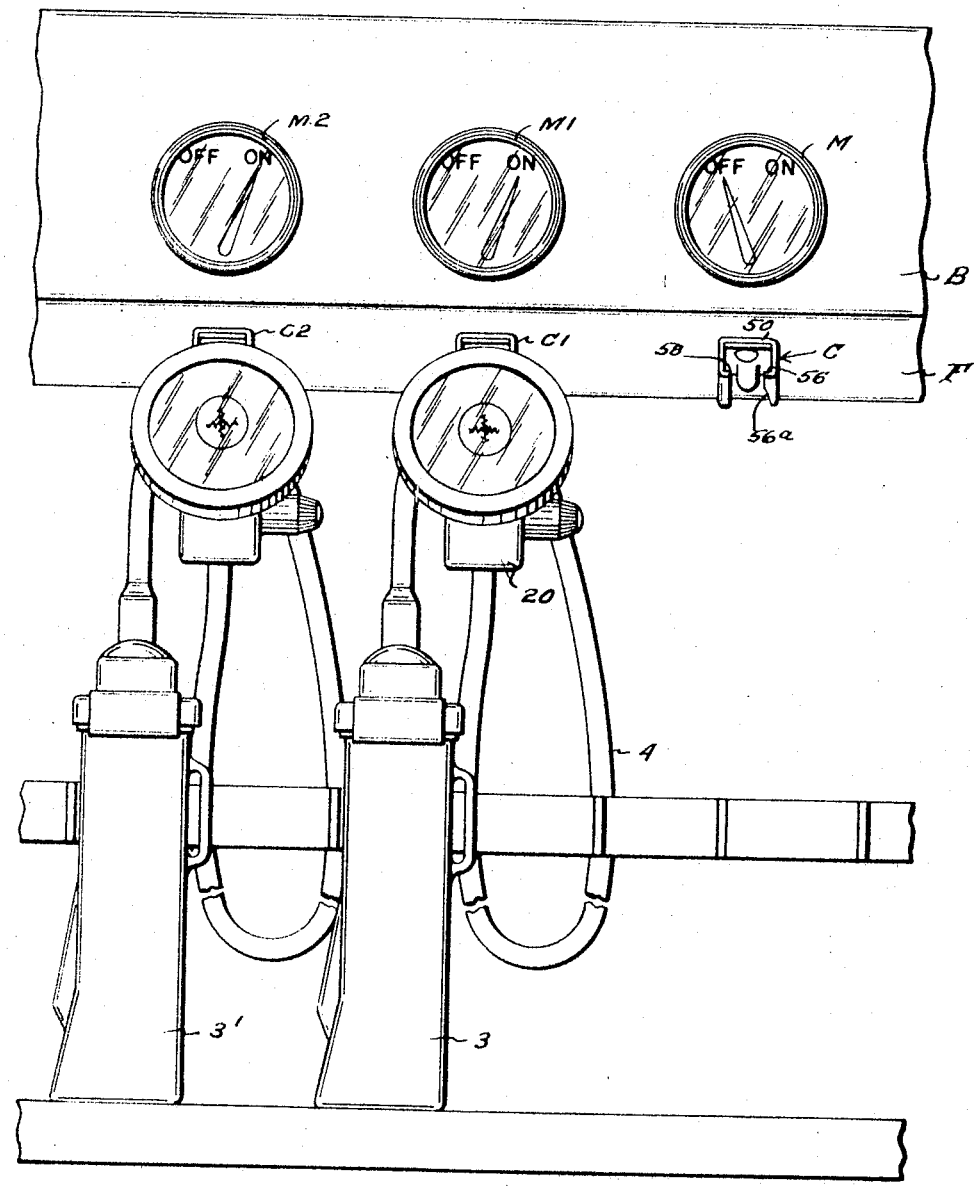

July 29, 1969   H. A. LOZEAU   3,458,697
SAFETY LIGHTING EQUIPMENT

Filed March 9, 1967   6 Sheets-Sheet 5

Inventor:
Homer A. Lozeau
by Thomas H. Hamilton
Attorney

United States Patent Office 3,458,697
Patented July 29, 1969

3,458,697
SAFETY LIGHTING EQUIPMENT
Homer A. Lozeau, Worcester, Mass., assignor to Koehler Manufacturing Company, Marlboro, Mass., a corporation of Massachusetts
Continuation-in-part of application Ser. No. 538,891, Mar. 1, 1966. This application Mar. 9, 1967, Ser. No. 621,917
Int. Cl. F21v 25/02
U.S. Cl. 240—11.3        4 Claims

ABSTRACT OF THE DISCLOSURE

Miner's safety lamp apparatus equipped with a novel bezel member adjustably secured about the lamp enclosure. The bezel member has an inner peripheral locking rim which is recessed at spaced apart points to form notches. The bezel member is selectively locked into place by a locking slide having an engaging tip that is moved into and out of the notches when the bezel member is in a threaded position around the lens opening. The locking slide is arranged in the lamp apparatus in an angular relationship with respect to the central axis of the bezel. The locking slide is constructed with an indicator pin which projects through the lamp apparatus body when the slide is withdrawn from a bezel notch. The bezel member can only be released by retracting the locking slide. Hence, tampering or dismantling the lamp while in use is prevented.

---

This application is a continuation-in-part of application Ser. No. 538,891, now Patent No. 3,408,490, filed Mar. 1, 1966.

The present application, as well as the earlier application noted, relates to portable safety lighting equipment having electrical components which are protectively confined so that they may be safely employed in explosive atmospheres and which are, in addition, selectively locked together to prevent tampering or dismantling while in use. More particularly, the invention is concerned with a miner's safety cap lamp apparatus of the class including a headpiece containing a lamp and electrical components, a storage battery carried from a miner's belt, and a flexible cord containing conductors for carrying current from the battery to the lamp in the headpiece.

The invention comprises a miner's safety cap lamp apparatus including a battery and a specially constructed headpiece connected to the battery by suitable conductors. Received in the headpiece is a dual locking system for the headpiece bezel ring and also electrical charging contacts, both of which are housed in a common receptacle in a fully protected position against tampering and both of which may be operated by a charging accessory when the battery is placed on charge.

In the use of miner's cap lamps of the class referred to, it is customary for the miner when leaving the mine to place the cap lamp apparatus in a battery charging rack so as to maintain the storage battery on charge when the equipment is not in use. Since it is required by law in many mining areas that all internal parts of a miner's lamp, as well as the charging terminals and other removable parts of a miner's lamp be locked against tampering while in use, the conventional form of headpiece has usually been provided with separate locking means for the lamp bezel. In addition, charging terminals are in some miners' lamps arranged internally of the headpiece and require the use of a special battery charging key mechanism located in the battery charging station. In other miners' lamps the charging terminals are secured in a hinged battery top which is mechanically locked.

For further details of one typical miner's cap lamp apparatus which has been widely used for many years, reference may be had to U.S. Patent Nos. 2,312,613 and 2,312,614, which patents are owned by the assignee of the present application.

While cap lamps of the class disclosed in these patents have been satisfactory and a substantial improvement in the art, there are certain disadvantages present in connection with their daily use and maintenance. Provision of a separate locking system for the bezel necessitates the use of a special tool and is time consuming to operate, as well as not always furnishing as complete tamperproof protection as desired. Thus a need exists for a simplified more effective and quickly operated bezel lock.

Similarly, the key operated battery charging terminal arrangement described above requires a headpiece construction which must be made larger to house all of the internal locking elements. Increasing the size of the headpiece creates a further disadvantage. This is due to the fact that in utilizing a battery charging key mechanism the headpiece has to be rotated by hand about the key which is held in a fixed position in the battery charging rack. As a result where a row of headpieces are to be placed on charge, additional space must be provided in the battery charging rack in order for the rotative movement of the lamp and cord to be freely carried out. This imposes a limitation on the number of lamps which can be handled in any given space. More importantly a time delay is necessarily experienced by each miner in placing a lamp and battery on charge as the locking mechanism must first be released. With a considerable number of miners moving into and out of a lamp house such a time delay can be a source of difficulty at the beginning or ending of a work shift;

It is, therefore, a chief object of the invention to provide improved safety lighting equipment which is compact, easy to operate and capable of being safely used in mines or other localities where explosive atmospheres are encountered;

Another object of the invention is to devise a locking mechanism which can be utilized by a miner with a substantial reduction in the time interval required to put a battery on charge in a lamp house;

Another object of the invention is to devise a simplified locking system for both bezel and charging contacts so that the use of a separate tool for the bezel lock may be eliminated and the two locking devices may be combined in one headpiece receptacle;

Still another object of the invention is to devise a bezel lock slide mechanism and indicator which engages against a bezel ring surface with a minimum of frictional contact and which may be operated either mechanically or manually;

A further object is to combined with a bezel ring, locking means and locking notches which are sealably protected against dirt, moisture and other foreign matter.

With these objects in mind, I have provided an improved safety lighting apparatus which is based on the concept of combining a dual locking system for bezel and charging contacts in cooperating relationship at some convenient point in a miner's headpiece member.

I have further devised a specially formed headpiece receptacle in which both bezel locking components and battery charging contacts are housed. In this one receptacle I provide a simplified battery charging terminal arrangement and a bezel lock arranged to receive a specially designed battery charging accessory. By means of this battery charging accessory a battery charging operation on a charge rack may be carried out independently of the bezel lock operation and yet when desired the bezel lock may be automatically released by the step of placing the battery on charge and an important reduction in the time required to place the battery on charge is realized.

An important feature of the arrangement described is the provision of a novel headpiece construction formed with a common receptacle which is arranged adjacent to the bezel of a headpiece and which contains both bezel lock means and charging contacts in such relative position that selective engagement by the charging accessory can operate either or both and yet these parts are maintained at all times in a fully protected position against tampering.

Another desirable feature of the invention is the provision of trapping spaces arranged in the common receptacle so as to provide for engagement by a special battery charging accessory while at all times preventing tampering with the lock mechanism. The trapping spaces are designed especially to prevent any tool or device other than the special battery charging accessory from being inserted in the receptacle.

Still another desirable feature of the bezel lock is that it may be tightened to any desired position and need not be adjusted to a particular position in order for the bezel lock to become properly engaged.

The nature of the invention and its other objects and novel features will be more fully understood and appreciated from the following description of a preferred embodiment of the invention selected for purposes of illustration and shown in the accompanying drawings, in which:

FIGURE 2 is an elevational view of the miner's safety lamp headpiece of the invention with a bezel locking means shown partly in elevation;

FIGURE 3 is a cross section taken on the line 3—3 of FIGURE 2;

FIGURE 4 is a detail perspective view of a special battery charging accessory member;

FIGURE 5 is a cross section taken on the line 5—5 of FIGURE 4;

FIGURE 6 is a detail elevational view of a recessed receptacle portion of the headpiece in which the locking slide is designed to be received;

FIGURES 7, 8 and 9 are detailed elevational views of locking slide cover plate components;

FIGURE 10 is a cross section taken on the line 10—10 of FIGURE 2;

FIGURE 11 is a cross sectional view taken on the line 11—11 of FIGURE 2;

FIGURE 12 is a fragmentary elevational view of the headpiece showing the locking slide in a disengaged position and also illustrating an accessory member in an operative position;

FIGURE 13 is a fragmentary detail end view of the headpiece;

FIGURE 14 is a fragmentary elevational view of the headpiece with the accessory member shown in FIGURE 12 being indicated in a reversed position;

FIGURE 15 is a fragmentary front elevational view of a battery charging rack with headpieces of the invention shown mounted thereon in a battery charging position;

Figure 1:
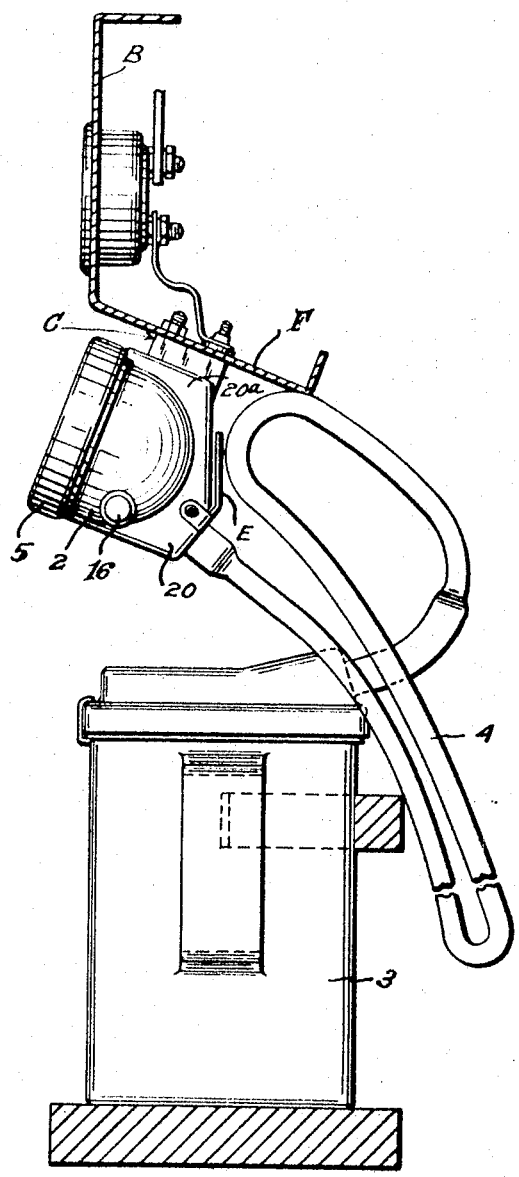
FIGURE 1 is a side elevational view of the safety lighting apparatus of the invention including a battery and headpiece, with the headpiece being shown mounted in charging position on a battery charging rack utilizing a charging accessory of the invention.

In the structure shown in the drawings, I have disclosed a preferred embodiment of the invention in the form of miner's cap lamp apparatus. It will be understood that while the invention will be described in detail with reference to a miner's cap lamp structure, this is not done in any limiting sense and both the bezel locking and battery charging features hereinafter disclosed may be applied to other forms of portable lighting equipment, either separately or in conjunction with one another.

Attention is also directed to the fact that the portable lighting apparatus of the invention is designed for use by a miner in two different ways. In one case the equipment is carried by a miner in a mine for lighting purposes. In the second case the equipment is placed by the miner on a charging rack and left there for maintaining the battery on charge or for otherwise servicing the headpiece components.

Thus the invention in its simplest aspect comprises a standard type battery and headpiece with specially designed bezel lock means and lock accessory. In another form the invention includes the battery and headpiece together with a battery charging rack and battery charging accessory mounted on the charging rack. Both adaptations of the invention are shown in the drawings.

Considering the invention in detail, FIGURE 1 denotes a typical charging rack B used to charge a battery 3. Charging racks of this form are commonly used with miner's cap lamp apparatus of the class presently manufactured and sold by the Koehler Manufacturing Company of Marlboro, Mass., a detailed description of which apparatus is set forth in United States Patent No. 2,947,851.

As shown in FIGURE 1 the miner's cap lamp apparatus of the invention is connected to battery 3 and supported on the rack B in an inverted position. This cap lamp apparatus is designed, when used by a miner, to be attached to the miner's cap by a clip E in the well known manner and some of the components of the cap lamp are of conventional nature as will be indicated below.

The storage battery 3 of conventional type is provided with electrical conductors enclosed in a flexible cord 4 and connected to a headpiece 2. The headpiece 2 is preferably made of molded plastic insulating material and is formed with the usual lamp chamber 6 and a circular lens opening in which is contained a lens 10. In the lamp chamber is a lamp 8, a lamp socket 12 and a reflector 14, as is more clearly shown in FIGURE 16.

Figure 16:
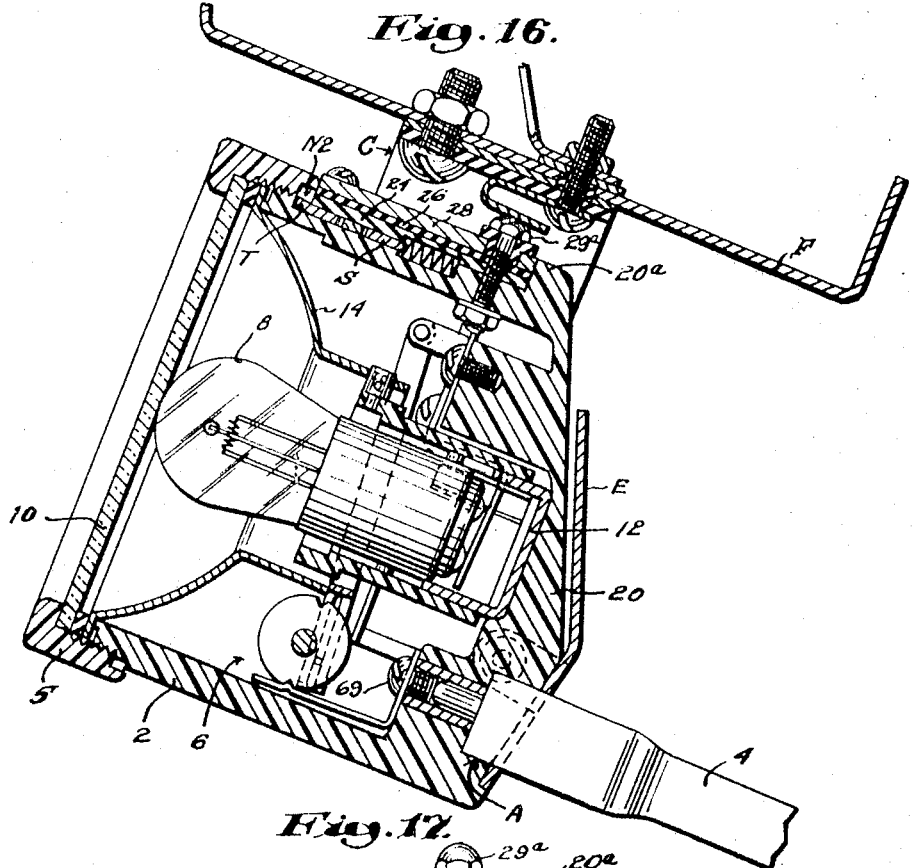
FIGURE 16 is a cross sectional view of the headpiece taken centrally of the lamp chamber with the bezel and lens fully engaged.

The lamp 8 is preferably of the two filament type and controlled by a knob 16 which may be operated to energize either one of the filaments in the lamp as desired, as well as moving a reflector apparatus for selectively focussing a reflected beam of light from either of the filaments. This dual filament and focussing arrangement is shown in FIGURE 16 and is further described in detail in United States Patent No. 2,947,851 noted above.

In accordance with the invention, I provide a specially formed bezel member 5 which is adapted to be secured around a threaded part of the headpiece 2, and I also form one side of the headpiece 2 with an extension 20 which projects rearwardly as normally viewed in use on a miner's cap lamp. As shown in FIGURES 2 and 16, extension 20 is provided with a recess A in which the cord 4 is connected to terminals therein. It is customary for the cord 4 when thus attached to extend upwardly over the miner's cap and then downwardly to the battery 3 attached at a convenient point on a miner's belt.

Considering further the specially formed bezel member 5 of the invention, I construct this part with an inner peripheral locking rim which, as noted in FIGURE 2, is recessed at spaced apart points to form notches as N, N1, N2, etc. I still further provide a locking slide element S having an engaging tip T. This locking slide S may be resiliently supported on the headpiece at some convenient point in a right angularly disposed position so that the engaging tip can move into and out of any one of the notches when the bezel member 5 is in a threaded position around the lens opening and the bezel may thus be locked into place and when so locked can only be released by retracting slide S.

In one preferred arrangement for supporting the locking slide S, I construct the headpiece extension 20 with an enlarged base section 20a. This base section 20a is recessed as indicated in FIGURES 2, 3, 6 and 10 to provide a rectangularly shaped receptacle R. FIGURE 2 shows the slide S in the receptacle as viewed from an underside of the base section 20a which the engaging tip T engaged in bezel notch N2 in a locked position.

The receptacle R and the locking slide S are normally covered over by a cover plate assembly, the constituent parts of which are more clearly shown in FIGURES 7, 8 and 9 and noted by numerals 24, 26 and 28. This cover assembly is tightly fitted against a ramp portion 29 as shown in FIGURES 11, 13 and 16 being secured thereto by a screw fastening 29a. It will be observed from an inspection of FIGURE 13 that edges of the cover plate assembly project beyond the ramp portion 29 and as is clearly indicated in FIGURE 13 these edges define narrow slideways 31 and 33. It is pointed out that in the cover plate assembly 24, 26 and 28, the part 24 constitutes an insulated contact holder, the part 26 is a contact insulator, and the part 28 acts as an external cover and holding member.

In FIGURE 6, I have indicated the receptacle R as it appears with the cover plate assembly detached and the slide S removed. As will be observed from an inspection of FIGURE 6 there is provided in the ramp portion 29 a spring retaining cavity 30 in which may be held in a normally compressed state a small coiled spring 32. This spring 32 is not shown in FIGURE 6 but appears in FIGURES 2, 10, 12 and 14.

The coil spring 32 is arranged to project slightly beyond a slide cavity 34 formed in the ramp 29 and along which the slide S is adapted to be slidably received in a position such that a small projection part S2 can extend into one open end of the coil spring 32 as is most clearly shown in FIGURE 2.

The slide cavity 34 is defined on two opposite sides by guide edges 36, 37 and 38, and on two remaining sides by guide edges 39 and 40. The oil spring 32, when in place, normally urges the slide S against the guide edge 39. The slide S is recessed along one edge to provide an irregularly shaped slot 42 as will be observed from an inspection of FIGURE 2, and arranged in receptacle R to cooperate with this slot 42 is a slide actuating pivot 44 pinned at 43 beside the slide cavity 34 as may be more clearly seen in FIGURES 6, 12 and 14. One side 42a of slot 42 when engaged by the pivot 44, permits movement of the slide freely in its retracted position. The other side 42b of slot 42 if forced against the pivot 44 independently, will jam against the pivot so that movement of the slide is prevented.

The arrangement of the pivot 44 and irregularly shaped slot 42 relative to one another is such that when a turning force is exerted against a cam surface 46 on the pivot 44, the opposite extremity of the pivot will engage in the slot and move the slide S against the spring 32 thus retracting the engaging tip T from a notch as N2 in the bezel 5 as shown in FIGURE 12. This allows the bezel member to become free to be rotated. If, however, the slot side 42b is forced against the pivot in the position shown in FIGURE 14, then the pivot 44 is jammed and movement of the slide is prevented.

There is thus provided a simple easily operated protective betzel lock which can be used by a miner when carrying a lamp and headpiece in a mine with full safety and protection against tampering. It will be noted that the locking mechanism may be placed in an operative position simply by turning the bezel on the threaded lens opening until one of the notches becomes fully engaged with the silde S. Once this occurs however, a reverse rotation of the bezel is prevented and the lock is permanently mainttained until such time as the pivot member is actuated.

Another important feature of the bezel construction is that the bezel may be tightened to any desired position and yet does not need to be adjusted for the bezel lock to enter a notch. This is an advantage in assembly since a workman need not tighten the bezel to the full extent and yet can back of slightly to position a notch for engagement by the lock.

It will be appreciated theretfore that the bezel can be tightened to the maximum as a means to preventing leakage. However, even if the lock is not engaged at this maximum position, any opposite rotation will lock the bezel as the first notch passes by the lock slide.

In order to exert a turning force on the pivot cam when the plate assembly 24, 26 and 28 is secured in place, I have devised a special lock activating accessory. This member may, however, perform a further useful function in carrying out a battery charging operation as hereinafter disclosed and may therefore also be referred to as a "battery charging accessory" and is generally denoted by the arrow C and is shown in detail in FIGURES 4 and 5.

As illustrated in FIGURES 4 and 5, the battery charging accessory C consists in a generally U-shaped member having a central portion 50 and two right angularly disposed side portions 52 and 54 which terminate in folded edges 56 and 58. These edges 56 and 58 are chosen of a thickness such that they may slidably engage in the slideways 31 and 33 in the receptacle R. When the edges 56 and 58 are fully advanced into the slots 31 and 33 in the position shown in FIGURE 12, the edge 58 engages against the cam surface 46 and causes the pivot 44 to rotate and move the slide S from the position shown in FIGURE 2 into the position shown in FIGURE 12. In this latter position it will be readily apparent that the bezel 5 may be unthreaded from the headpiece 2. It is pointed out that the accessory C may be utilized without any reference to battery charging when so desired.

To utilize the accessory C in connection with a battery charging operation, I further provide novel electrical contact means in the accessory end in the receptacle R for cooperating with the accessory C and establishing a charging circuit through the headpiece and cord to the battery. FIGURES 1, 15, 16 and 17 show the headpiece in an inverter position assumed when a charging operation is being carried out.

Figure 17:
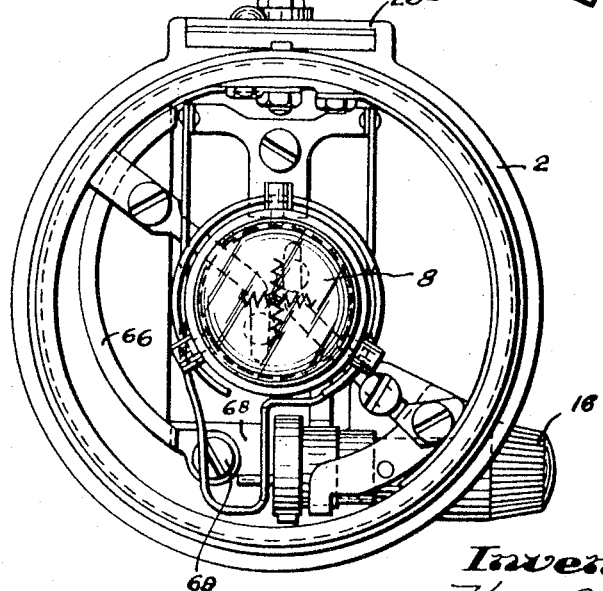
FIGURE 17 is a detail end view of the lamp supporting structure looking directly into the lamp chamber with the lens and bezel removed.

As will be observed from an inspection of FIGURE 17, the lamp chamber has mounted therein an arcuate contact member 66 one end of which is received on a boss 68 in the inner headpiece wall. Through this boss 68 is formed an opening which communicates with a similar opening in arcuate contact 66 and also extends into the receptacle R to receive a threaded connection member 69 as may be more clearly seen in FIGURES 3 and 16.

Formed in the receptacle R (FIGURE 6) is a terminal block 70 having an opening for also receiving the threaded connecting member 69 (FIGURE 3). Arranged to register with the opening 72 is provided an electrical conductor part 73 which is recessed into one side of the cover assembly element 24 as better shown in FIGURES 3 and 7 and which is also adapted to have received therethrough the threaded connection member 69.

The electrical conductor 73 is further formed with a spring extension 75 having a bent-over end 76 which is located through an opening 77 in the cover plate element 24 and which is adapted to lie in contact with a trapping block 79 provided in the receptacle R in the manner shown in FIGURE 6. It will also be observed that the charging accessory functions as a negative charging contact as suggested in FIGURES 3 and 5.

Thus it will be observed that when the cover plate assembly is in a fully secured position, as shown in FIGURE 3, and the negative contact or edge 56 of battery charging accessory C is passed through the slideway 31, an electrical contact will be made between this member and headpiece contact 73. At the same time contact 60 connects with positive contact 29a on the headpiece, thus completing a charging circuit to the battery charging apparatus.

It is also recognized that for certain uses of the charging accessory it may be desirable to provide for the charging operation being carried out without the bezel lock being released. With this requirement in mind, I have further formed the accessory C with the beveled edge 56a as shown in FIGURE 4 and also in FIGURES 12 and 14. By means of this beveled edge the charging accessory may be attached to the headpiece in a reversed position as particularly shown in FIGURE 14 with the result that the pivot 44 will not be actuated and yet a battery charging circuit through all of the contacts noted above will be completed.

A further highly important feature of the combined lock and battery charging apparatus is realized from the greatly simplified operability and handling characteristics which are accomplished with the unique arrangement of accessory and charging contacts described. These advantages may be more fully appreciated from an inspection of FIGURE 15. As noted therein the charging rack B may be provided with a shelf or apron F preferably extending angularly inwardly as shown in both FIGURES 1 and 15. On this shelf or apron F may be located any suitable fastening means a plurality of accessory members as C, C1, C2, etc., occurring immediately below metering dials M, M1, M2 in the rack B.

The spacing between these accessory members C, C1, C2, etc may be maintained much less than the spacing required for conventional forms of charging contact lock mechanisms heretofore utilized on battery charging racks of this nature. It is pointed out that this is due to the fact that no rotative movement of the headpiece is required with the charging accessory member of the invention. Quite the opposite is the case with conventional charging rack and lock arrangements where the headpiece has to be engaged with the locking key and then rotated through a substantial arc of rotation, thus requiring additional space through which the headpiece may be moved.

It will be apparent that with applicant's headpiece and charging accessory arrangement, a simple forward sliding movement of the headpiece over the accessory edges is all that is required to attach the headpiece in a charging position, and since no rotative movement is involved, a substantially larger number of headpieces can be mounted in a given size of charging rack.

For example, in a typical charging rack a six foot length of shelf and charging panel is required for seventeen evenly spaced headpieces. In comparison a similar shelf for the headpiece of the invention could accommodate as many as twenty headpieces and possibly more. It will be understood that desirable economies in construction of the charging equipment may be realized and of even more importance a very desirable saving in time is realized from the simplified operation of engaging or disengaging a headpiece.

It will be noted that a tamper proof battery charging circuit means is provided in the receptacle R and can only be placed in a closed circuit position by the application of a specially formed actuating edge of the battery charging accessory C. To insure against any possible tampering with the contact surface 76, I have further devised a trapping space 80 in the receptacle R. This trapping space 80 occurs at a different level than the surface of the member 79 against which the bent-over portion 76 of the member 73 is held. By means of this trapping space, insertion of a tool as suggested in broken lines at the lower side of FIGURE 3 through the slideway 31 is prevented through a tamper resistant spring 82 which is located through the cover plate element 24 as shown in FIGURE 7.

The spring 82 as indicated in FIGURE 3 projects into the trapping space 80 in such a way that any device or tool moving into the slideway 31 will be forced against one end of the trapping space 80 and prevented from reaching the member 73. If a similar tool or strip of material is inserted into the receptacle between the top of the cover plate and the side of the receptacle, it will be forced to come into contact with one edge of the trapping block 79 and similarly prevented from coming into contact with the member 73.

In a similar manner the pivot member 44 is protected by a trapping space 88 which occurs at a different level than the level on which the pivot 44 is supported and in the same manner a tool will be deflected against one or the other of the edges to prevent tampering.

Figure 18:
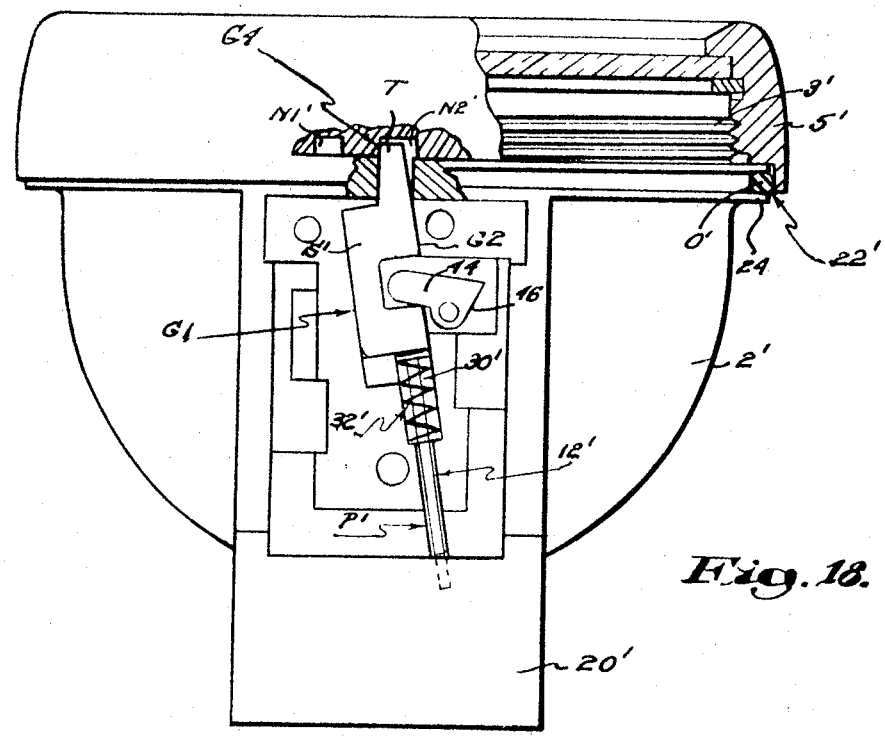
FIGURE 18 is an elevational view of the headpiece partly in cross section illustrating a modification of slide mechanism including indicator means and special sealing means.

In FIGURE 18, I have disclosed a modified headpiece construction including a headpiece body 2' of the same general type comprised by the headpiece already described. This headpiece 2' is formed with a threaded part 3' around which is threaded a bezel 5' having notches N1', N2', etc. Numeral 20' denotes an extension part formed on the headpiece and recessed to house a bezel locking mechanism generally corresponding to that already described and including a slide element S' having a locking tip T'. The slide S' is supported in a receptacle R' formed in extension 20 as shown in a position to move into or out of engagement with any one of the notches N1', N2', etc. The slide is resiliently engaged by a spring 32' supported in a spring cavity 30'.

An important feature of the spring and slide arrangement described is an angularly disposed relationship of parts with respect to the bezel and its notches. As will be observed from an inspection of FIGURE 18 the slide S' is guided between two parallel but angularly extending guide surfaces G1, G2, and the tip T1 is also formed with a similarly angled surface G3 at one side and a substantially normal surface G4 at the opposite side thereof. Similarly the spring cavity 30' and spring 32' are disposed in the extension 20' at an angle to the central axis of the headpiece corresponding to the angle of the guide surfaces G1 and G2.

In the relative position described, a slide actuating pivot 44' when engaged along its cam surface 46' will start to move the slide tip away from the notch N1' as shown in FIGURE 18 and this is accomplished with little if any frictional drag between the slide tip T' and the adjacent contacted surface of notch N1'. Immediately thereafter the tip moves completely out of contact with the notch surface and thus the operation of unlocking or disengaging the bezel lock tip is greatly facilitated and made more positive even after the apparatus has been in use for a considerable period of time.

The angular slide assembly described has the further advantage that it may be more easily and positively moved from an unlocked position into a locking position when operated by disengaging the battery charging clip.

I have further provided an indicator pin P' which is in contact with the bottom of slide S' and guided in a pin slot 12' as shown. Both the pin slot and pin P' are angularly disposed in the manner above specified. The pin slot 12' is extended through an outer exposed surface of the extension 20' so that the outer end of the pin P' may project outwardly as suggested in dotted lines in FIGURE 18. When the tip T' of the slide is disengaged from a bezel notch the pin is readily observed by an operator. There is thus afforded a convenient indicator for denoting when the bezel is not in a fully locked position.

It will also be observed that by arranging the pin P′ in a projecting relationship with respect to the headpiece extension it becomes possible to manually force the pin P′ into a locking position. This it will be appreciated is done without using the battery charging clip or without relying upon the spring 32′ and thus more latitude is realized in the locking and unlocking function and in the event of spring failure or spring weakness, the locking function can always be safely carried out by the operator.

In thus securing the bezel with a series of internal notches and cooperating slide means for engaging in the notches, I may also wish to keep dirt and moisture out of the notches in order to avoid any interference or sticking of the slide tip T′ in the notches. It may also be helpful to keep moisture and dirt out of the slide receptacle itself, as well as the headpiece reflector which is enclosed by the bezel.

As one suitable means for excluding dust and moisture, I have formed the bezel 5′ with a recessed portion 22′ which is designed to extend downwardly around a headpiece flange part 24′ and form an annular space in which is sealably contained a rubber sealing member O′. Member O′ may, for example, comprise an O ring of conventional type. This member O′ when securely held with the bezel 5 tightly threaded on the headpiece functions to provide an effective sealing mechanism for positively excluding dust and moisture from entering.

From the above description of the invention it will be apparent that I have disclosed a novel bezel lock which can be compactly arranged in a headpiece and which is characterized by an extremely simple and rapid adjustment to carry out a locking or unlocking operation. The locking components are more nearly tamper proof than conventional locks and the bezel locking parts provide an option to the operator so that he may or may not release the bezel lock when the battery is placed in position for charging.

In addition, the bezel notch arrangement permits tightening the bezel in very small increments of tightness and desirable sealings advantages may be realized with a positive locking action always being insured. The design of the bezel lock and its cooperating accessory makes possible a reduction in headpiece size and closer spacing of a plurality of headpieces on a charging rack.

By means of the indicator pin it may be readily observed whether the bezel locking mechanism is fully operative and if for any reason the mechanism does not properly engage it may be manually placed in a locking position by depressing the indicator pin as described above. It is also pointed out that this headpiece is combined with a sealably secured bezel which resists penetration by dirt or moisture.

There is also combined in the invention a novel charging means which permits saving in time, space and equipment while providing selectivity in releasing or not releasing the bezel lock as noted above. The charging contacts, as well as the bezel lock are protected in a highly tamper proof manner by means of special trapping spaces arranged to prevent insertion of tools or other devices.

While I have disclosed a preferred embodiment of the invention, it should be understood that changes and modifications may be resorted to within the scope of the appended claims.

I claim:

1. Improved safety lighting apparatus including a lamp supporting body formed with a lamp chamber, a lamp socket and an electrical lamp detachably secured in the socket, means including a current source and electrical conductors for conducting current from the source to energize said lamp, a lens mounted around one side of the lamp supporting body, a bezel member adjustably secured about a threaded part of the lamp supporting body to hold the lens in position, and locking means movable in the lamp supporting body for selectively engaging and locking the bezel in a fixed position to prevent tampering, said bezel lock being formed at its inner periphery with spaced notches and the said locking means includes a slide element movable into and out of engagement with the bezel notches, said slide element being arranged in the lamp supporting body in angularly disposed relationship with respect to the central axis of the bezel and said slide element being further formed with an engaging tip having two opposite sides thereof occurring angularly with respect to one another to selectively engage one side of a bezel notch.

2. Improved safety lighting apparatus including a lamp supporting body formed with a lamp chamber, a lamp socket and an electrical lamp detachably secured in the socket, means including a current source and electrical conductors for conducting current from the source to energize said lamp, a lens mounted around one side of the lamp supporting body, a bezel member adjustably secured about a threaded part of the lamp supporting body to hold the lens in position, and locking means movable in the lamp supporting body for selectively engaging and locking the bezel in a fixed position to prevent tampering, said bezel lock being formed at its inner periphery with spaced notches and the said locking means includes a slide element movable into and out of engagement with the bezel notches, said slide element being arranged in the lamp supporting body in angularly disposed relationship with respect to the central axis of the bezel and said slide element being constructed with an indicator pin which projects through the lamp supporting body when the slide is withdrawn from a bezel notch.

3. Improved safety lighting apparatus including a lamp supporting body formed with a lamp chamber, a lamp socket and an electrical lamp detachably secured in the socket, means including a current source and electrical conductors for conducting current from the source to energize said lamp, a lens mounted around one side of the lamp supporting body, a bezel member adjustably secured about a threaded part of the lamp supporting body to hold the lens in position, and locking means movable in the lamp supporting body for selectively engaging and locking the bezel in a fixed position to prevent tampering, said bezel lock being formed at its inner periphery with spaced notches and the said locking means includes a slide element movable into and out of engagement with the bezel notches, said slide element being arranged in the lamp supporting body in angularly disposed relationship with respect to the central axis of the bezel, said slide element being constructed with an indicator pin which projects through the lamp supporting body when the slide is withdrawn from a bezel notch and said indicator pin being manually operable to force the slide element into locking relationship with a bezel notch.

4. Improved safety lighting apparatus including a lamp supporting body formed with a lamp chamber, a lamp socket and an electrical lamp detachably secured in the socket, means including a current source and electrical conductors for conducting current from the source to energize said lamp, a lens mounted around one side of the lamp scupporting body, a bezel member adjustably secured about a threaded part of the lamp supporting body to hold the lens in position, and locking means movable in the lamp supporting body for selectively engaging and locking the bezel in a fixed position to prevent tampering, said bezel lock being formed at its inner periphery with spaced notches and the said locking means includes a slide element movable into and out of engagement with the bezel notches, said slide element being arranged in the lamp supporting body in angularly disposed relationship with respect to the central axis of the bezel and said bezel being formed with a recessed portion extending downwardly around the lamp supporting body, to define an annular space which is located outside of the said notches and a sealing ring mounted in the annular space outside of the said slide element to form a seal for excluding moisture and dirt from entering the notches when the slide is in a locking position.

(References on following page)

References Cited

UNITED STATES PATENTS

| | | | |
|---|---|---|---|
| 2,312,614 | 3/1943 | Wheat | 240—11.3 |
| 2,313,165 | 3/1943 | Nelms et al. | 240—11.3 |
| 2,535,819 | 12/1950 | Stamper | 240—11.3 |
| 2,592,208 | 4/1952 | Stamper | 240—11.3 XR |
| 3,051,831 | 8/1962 | Grieger et al. | 240—11.3 |

NORTON ANSHER, Primary Examiner

R. P. GREINER, Assistant Examiner

U.S. Cl. X.R.

240—10.6, 41.55